US009230401B2

(12) United States Patent
O'Halloran

(10) Patent No.: US 9,230,401 B2
(45) **Date of Patent: *Jan. 5, 2016**

(54) METHODS AND APPARATUS FOR SLOT MACHINE GAMES

(75) Inventor: Terry O'Halloran, Las Vegas, NV (US)

(73) Assignee: Bally Technologies ANZ PTY LTD, Milperra NSW (AU)

( * ) Notice: Subject to any disclaimer, the term of this patent is extended or adjusted under 35 U.S.C. 154(b) by 552 days.

This patent is subject to a terminal disclaimer.

(21) Appl. No.: 13/589,232

(22) Filed: Aug. 20, 2012

(65) Prior Publication Data

US 2012/0309498 A1 Dec. 6, 2012

Related U.S. Application Data

(63) Continuation of application No. 11/592,665, filed on Nov. 3, 2006, now Pat. No. 8,251,794.

(51) Int. Cl.
*G06F 17/00* (2006.01)
*G07F 17/32* (2006.01)

(52) U.S. Cl.
CPC .................................. *G07F 17/3244* (2013.01)

(58) Field of Classification Search
None
See application file for complete search history.

(56) References Cited

U.S. PATENT DOCUMENTS

| | | | | |
|---|---|---|---|---|
| 3,645,531 A | | 2/1972 | Wright | |
| 4,095,795 A | | 6/1978 | Saxton et al. | |
| 4,448,419 A | | 5/1984 | Telnaes | |
| 4,695,053 A | | 9/1987 | Vazquez et al. | |
| 4,711,451 A | | 12/1987 | Pajak et al. | |
| 4,838,552 A | | 6/1989 | Hagiwara | |
| 4,858,932 A | | 8/1989 | Keane | |
| 5,085,436 A | | 2/1992 | Bennett | |
| 5,102,137 A | | 4/1992 | Ekiert | |
| 5,154,421 A | * | 10/1992 | Hamano | 463/21 |
| 5,169,147 A | * | 12/1992 | Hamano | 463/21 |
| 5,209,479 A | | 5/1993 | Nagao et al. | |
| 5,219,167 A | | 6/1993 | Hamano | |
| 5,263,716 A | | 11/1993 | Smyth | |
| 5,423,539 A | | 6/1995 | Nagao | |
| RE35,188 E | | 3/1996 | Howard | |
| 5,697,843 A | | 12/1997 | Manship et al. | |
| 5,704,835 A | | 1/1998 | Dietz | |
| 5,722,891 A | * | 3/1998 | Inoue | 463/20 |
| 5,772,509 A | | 6/1998 | Weiss et al. | |
| 5,908,354 A | | 6/1999 | Okuniewicz | |
| 5,980,384 A | | 11/1999 | Barrie | |
| 6,053,813 A | | 4/2000 | Mathis | |
| 6,095,921 A | | 8/2000 | Walker et al. | |

(Continued)

FOREIGN PATENT DOCUMENTS

| | | |
|---|---|---|
| EP | 1 785 957 | 5/2007 |
| GB | 2 210 489 | 6/1989 |
| WO | 01/21268 | 2/2001 |

OTHER PUBLICATIONS

European Search Report for Application No. EP 1 785 957 dated Mar. 5, 2007.

*Primary Examiner* — Paul A D'Agostino
(74) *Attorney, Agent, or Firm* — TraskBritt

(57) ABSTRACT

A slot machine includes an option in which the probability of an outcome is influenced by changing the probability of one or more symbols occurring on one or more reels (reel 1, reel 2, . . . ) by randomly or pseudo-randomly selecting reels from a set of two or more reels. The probability can be adjusted by changing, adding or subtracting symbols on a reel strip.

20 Claims, 6 Drawing Sheets

(56) References Cited

U.S. PATENT DOCUMENTS

| | | | | |
|---|---|---|---|---|
| 6,117,009 | A | 9/2000 | Yoseloff | |
| 6,159,096 | A | 12/2000 | Yoseloff | |
| 6,394,902 | B1 * | 5/2002 | Glavich et al. | 463/20 |
| 6,413,162 | B1 * | 7/2002 | Baerlocher et al. | 463/20 |
| 6,796,903 | B1 * | 9/2004 | Bryant | 463/20 |
| 7,699,698 | B2 | 4/2010 | Randall | |
| 8,137,188 | B2 * | 3/2012 | Breckner et al. | 463/27 |
| 2003/0060269 | A1 | 3/2003 | Paulsen et al. | |
| 2004/0116173 | A1 | 6/2004 | Baerlocher | |
| 2005/0009597 | A1 * | 1/2005 | Daly | 463/20 |
| 2006/0040728 | A1 | 2/2006 | Fuller | |

* cited by examiner

500

METHODS AND APPARATUS FOR SLOT MACHINE GAMES

CROSS-REFERENCE TO RELATED APPLICATION

This application is a continuation of U.S. patent application Ser. No. 11/592,665, filed Nov. 3, 2006, now U.S. Pat. No. 8,251,794, issued Aug. 28, 2012, which claims priority to Australian Patent Application Serial No. 2005906121, filed Nov. 4, 2005, the disclosure of each of which is hereby incorporated herein in its entirety by this reference.

FIELD OF THE INVENTION

This invention relates to improvements in slot machine games.

BACKGROUND OF THE INVENTION

The modern era of video slot machines has allowed manufacturers to use virtual reel strips, rather than traditional mechanical reel strips.

The operation of these reel strips are such that a machine picks a spot on the pre-determined order of symbols and displays on the screen that symbol and one symbol above and one symbol below, presenting three rows for the player to view. There are a fixed set of reel strips for a certain bet configuration. Some products change the reel strips during a bonus (but that set remains the same), some have a new set of reel strips in each game of a feature to make one symbol more prevalent (there will be consistency in the changes), and some games change the reel strips depending on the bet configuration picked by the player.

The "243 way" concept pays players according to symbols appearing anywhere on the reels rather than on a pre-determined line. This is also referred to as a scatter pay, where the appearance of specific symbols in any distribution on the displayed frames within the screen can constitute a winning outcome. The "243 way" refers to a 5×3 reel configuration with 243 possible ways of winning (3 to the power of 5). To bet fewer lines, players can play fewer ways. An 81 way pay corresponds to 3 to the power of 4, and a 27 way pay corresponds to 3 to the power of 3. To mathematically implement this, there are different reel strips for each bet configuration option made available to the player.

There are numerous ways in which the probability of outcomes in slot-type and video-type gaming systems are controlled (referred to herein as "slot games" unless distinguished in discussions as reel games or video games specifically). The ways in which probabilities are controlled must be acceptable to gaming jurisdictions and approved by the various jurisdictions. One well-established control of outcomes is taught by U.S. Pat. No. 4,448,419 to Telnaes in which a gaming machine of the type utilizing rotating reels (16) which carry a plurality of indicia on the periphery, a brake (19) to stop the reels at a selected position and a random number generator for selecting the reel stopping position. Numbers are assigned to the reel stopping positions and entered into the random number generator (41), with each number being entered one or more times to control the payout odds of each particular stopping position being selected, thereby enabling any odds to be set without changing the physical characteristics of the machine. The technology is also directly translatable to video systems in which the outcome or probabilities are also weighted by random number generators.

Similarly, but in a uniquely different manner, U.S. Pat. Nos. 6,117,009 and 6,159,096 to Yoseloff teach a method of configuring a video output gaming device to randomly generate game outcomes. The method includes the steps of selecting a set of game symbols, assigning a probability of occurrence to each symbol, selecting a plurality of outcome templates, each template comprising X variables, selecting a probability of occurrence for each outcome template, assigning a subset of symbols from the set of game symbols to each template for filling the positions, defining payouts for selected outcomes, and configuring a video output gaming device, which randomly selects a template, randomly selects a symbol for each variable in the template from the subset of game symbols assigned to the selected template, randomly fills at least a portion of the positions in the template and displays the outcome on a video output display. A video output gaming device is programmed to randomly select a template, randomly select symbols to define the variables and randomly display the selected symbols.

U.S. Pat. No. 6,095,921 to Walker et al. discloses a gaming device and method for operating the gaming device. The gaming device initiates a paid play, and determines an outcome of the play. The outcome is visually displayed using at least two graphical displays. The graphical displays comprise a first and second visual continuum, without discrete reel stops. The outcome is represented by the relative positions of the first and second visual continuums. The outcome may also be based on the relative position of the first and second continuums to a payline. A payout corresponding to the outcome is determined by the device and is awarded to the player.

U.S. Pat. No. 3,645,531 to Wright provides a horse-race wagering device in which a gaming machine comprises a projector for projecting an endless film of horse races. The film is divided into four subframes, a selected one of which is brought to a screen by means of a system of tilting mirrors. The selection of subframe is made at random twice in each race to give unpredictable variations of the race shown; a coin mechanism is provided so that bets can be made and winnings paid out in accordance with the outcome of the race.

U.S. Pat. No. 5,980,384 to Barrie describes a gaming apparatus and method in which there is a primary game and a secondary game that are dynamically linked, and the primary game can be won independently of the secondary game. The primary game may be won on each play of the game, and the secondary game may be won over a plurality of plays of the primary game. Primary game symbols appearing during plays of the primary game may cause: (i) movement of primary game symbols to secondary game display positions; (ii) primary game symbols directing play options of secondary game symbols; (iii) changing the options open to the player in his or her attempt to win the secondary game; (iv) symbols in the primary game being used as soft buttons to affect movement of game symbols from the primary game to the secondary game, and between symbol display positions in the secondary game; and (v) secondary game symbols persisting to subsequent plays of the primary game to help the player to win at the secondary game. Multiple images are shown associated with the positions of single frames.

Reissued U.S. Pat. No. RE35,188 to Howard discloses a reel for a fruit machine, a reel having standard symbols or fruit, on which secondary symbols, for example, numbers, are superimposed. The reel has a first, inner strip on which the standard symbols appear, the strip being carried by a reel drum. The secondary symbols appear on a second, outer strip glued to the first strip. The second strip is mostly transparent so that the standard symbols may be viewed with the secondary symbols superimposed on them.

Other games have a set of reel strips in the main game, and once free games are triggered, change to another set to increase the chance of players winning. This is done by increasing the number of higher paying symbols in proportion to lower paying symbols. This method is set and predetermined by the machine manufacturer.

A further game format may offer a free game bonus where more of the substitute symbols appear on the reels as each game continues. In these cases, one more symbol is added to the reel for each game. This means a new reel strip configuration for each free game.

Any reference herein to known prior art does not, unless the contrary indication appears, constitute an admission that such prior art is commonly known by those skilled in the art to which the invention relates at the priority date of this application. All references cited herein are incorporated by reference in their entirety for their technical disclosure.

SUMMARY OF THE INVENTION

A method of operating a slot machine game, the method including: providing a set of two or more reel strip options within the game machine and selecting one of the reel strip options for use in a game.

The set of two or more reel strip options can include two or more sets of reel strips (or virtual reel strips) in which the probability of one or more results or events is changed as between different reels strips amongst the set of reel strips in relation to the probability of that result or event in a standard reel or another reel within the set.

The probability of getting each or any set of reel strips can be changed and weighted automatically (e.g., by a CPU or computer) or as set by a game machine operator (not user) to suit the game overall.

The selection of the reel can occur automatically (e.g., by a CPU or computer) or as set by a game machine operator (not user) in response to the previous game result corresponding with one or more predetermined outcomes.

The selection of the reel can be performed on a random or pseudo-random basis.

The slot machine can be an EGM (electronic gaming machine, that is, a gaming machine having a video display system and a processor and/or computer that provides images on the video display that represents symbols, events, occurrences, frames, reels, patterns or other wagering events).

The selection of the reel(s) or sets of reels can be random or pseudo-random.

The selection can be performed under the control of the EGM software.

The combined average return of the reel strip options can be set by the system to be equivalent to a predetermined return.

The combined average return of the reel strip options can be the average of the returns of the individual reel strips in the set.

The weighting of one or more reel strips in the set can be changed by virtually adding one or more symbols. The weighting can be done by the processor/computer automatically or upon demand by a game machine operator locally or distally.

The weighting of one or more of the reels similarly can be performed by removing one or more symbols from the reel.

The weighting of one or more reel strips similarly can be changed by changing one or more symbols.

The number of symbols in the one or more of the strips can be unchanged in a reel strip option. That is, each of the strips may have the same (or different, if desired) number of symbols or stops on the entire virtual reel.

BRIEF DESCRIPTION OF THE DRAWINGS

An embodiment or embodiments of the present invention will now be described, by way of example only, with reference to the accompanying drawings, in which.

DETAILED DESCRIPTION OF THE INVENTION

This invention implements methods of enabling the players to receive a variety of outcomes using virtual electronic reel strips in a virtual reel-type electronic video gaming apparatus.

Figure 1:
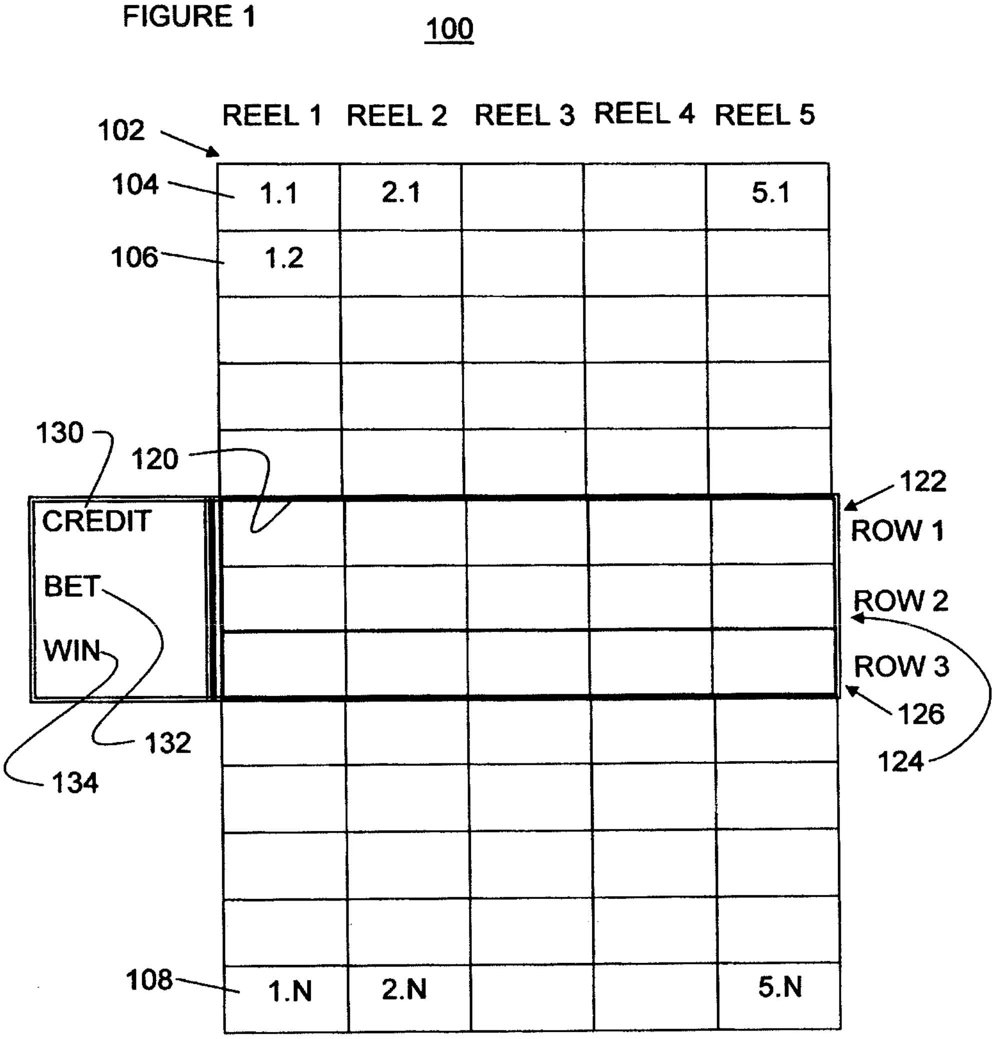
FIG. 1 shows a schematic illustration of a slot machine with fixed length reels.

FIG. 1 illustrates a schematic view of a slot machine 100 having five reels 102 and a window 120 having three rows 122, 124, 126. Each reel has N symbols 104, 106, 108 providing 5×N symbols referenced in FIG. 1 as item numbers 1.1 to 5.N, of which 3×5 are displayed in the window 120 at the end of each game. During the playing of a game, the symbols on the reels can be provided in a visual pattern of images that simulates the symbols as scrolling through the window at a speed which, at least for part of the game play period, is sufficiently slow that they are legible to the player. Usually the symbols are legible for the last portion of the play period. This builds the sense of anticipation for the player. The rate of scrolling may also be altered during display to further enhance the expectations of a player.

In normal play, prize results are determined when a predetermined number and/or orientation of a particular type of symbol or group of symbols appear on a single pay line 130, 132, 134. The probability of a particular prize result is determined by the probabilistic number of the specific symbol associated with a position or frequency of occurrence of that symbol on each reel. Thus, for symbol "XXX," if there are 5 "XXX" symbols on Reel 1, then the probability of "XXX" appearing on Reel 1 of Row 2 is 5:N. Similarly, the probability of "XXX" appearing on Row 2 of Reel 2 is determined by the number of "XXX" symbols on Reel 2 divided by N, where N is the total number. If there are thirty symbols on a virtual reel, then the literal probability would be 1:30 for each symbol. However, if 1000 numbers were distributed among the thirty symbols in a disproportionate distribution, that literal probability can be significantly altered to adjust the number of symbols on the reel. The probability of "XXX" appearing on each of Reels 3 to 5 is determined in the same manner. Hence, the probability of "XXX" appearing a specified number of times on a row can be calculated. Weighted probabilities may also be assigned to each symbol, beyond the mere literal frequency of a specific number or symbol from within a reel. For example, if the first of the thirty symbols was assigned 500 of the 1000 available numbers, its probability or frequency would become 1:2 occurrences, on average.

Figure 2:
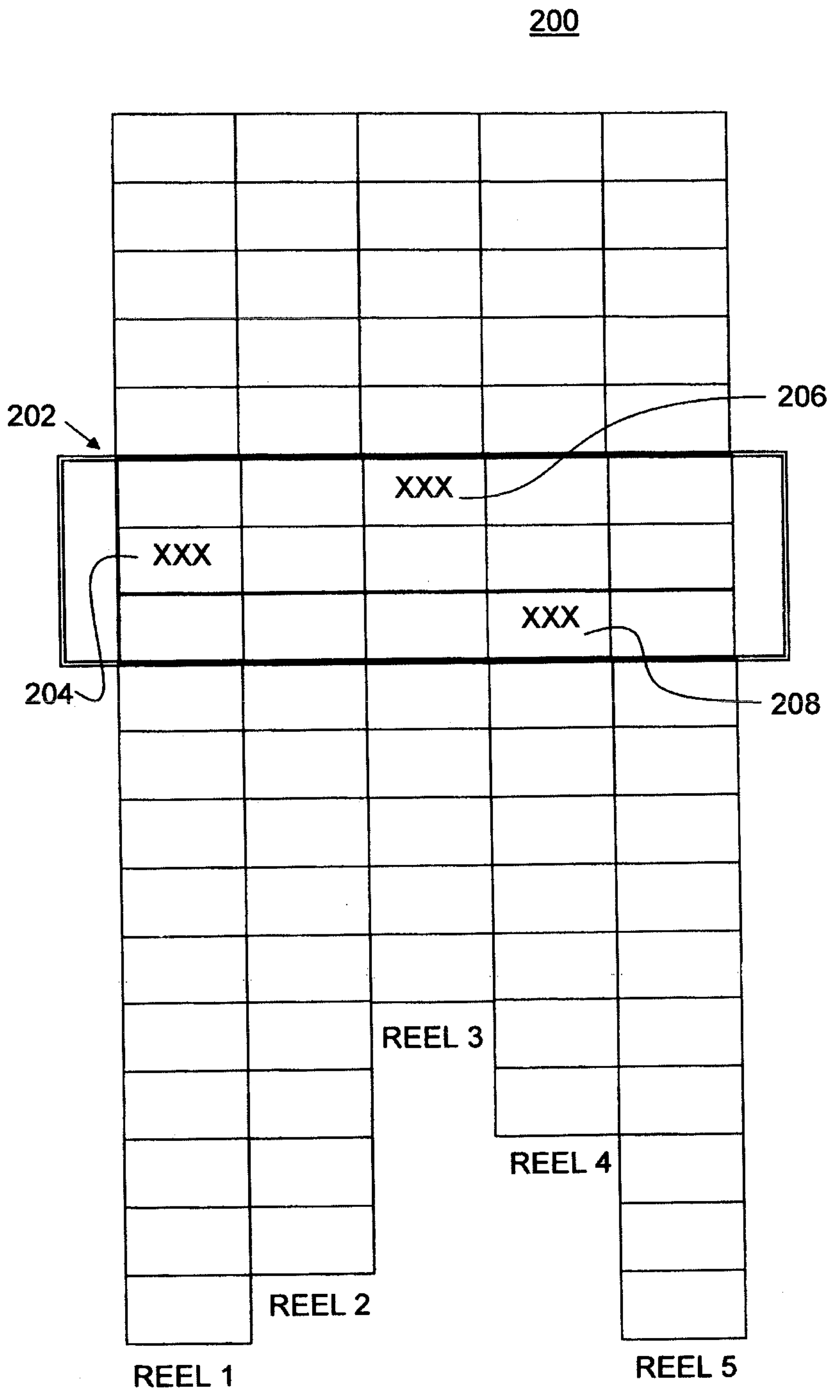
FIG. 2 shows a schematic illustration of a slot machine with adjustable length reels.

FIG. 2 is a schematic illustration of a set of reels 200 in which the number of symbols 204, 206, 208 in at least one reel differs from the number of symbols in a "standard" reel. The term "standard reel" may apply to any single reel or sets of like reels in the gaming machine. For convenience, the term would usually apply to the reel with the most event literal probabilities for symbols on the reel and/or with the middle-most (median or average) probability for highest value symbols on the reels. The embodiment of FIG. 2 allows for the possibility of there being different numbers of symbols in at least one reel. Because there are different numbers of symbols in at least one reel, the probability of any outcome is altered as between reels with different numbers of symbols, one of the reels being considered, for purposes of comparison, a standard reel. The probability of a particular outcome can be increased by increasing the number of symbols corresponding to that outcome in one or more reels. It should also be appreciated that in one aspect of this technology, the different available reels, in each of the positions available for the reels in a visual display 202, may be used in the same game. That is, changing the reels does not have to, and preferably does not, change the underlying game or the appearance of the underlying game, as from a themed standard reel with cherries, bells, lemons, sevens, bars, plumbs, oranges, and the like, to a reel with poker card symbols. The game symbols may remain the same, but the probability and frequency of individual symbols on reels within the selectable reels in the set may change from reel to reel.

In one embodiment of the invention, the outcomes are weighted so that a player can be awarded a feature, which includes a random selection made by the machine from a variety of reel strips. A preferred embodiment of the technology is for the weighted alteration in the reels to be provided as part of a bonus award or bonus event, with a random number of spin events awarded, specific numbers of spin events awarded, or a number of spin events awarded that is dependent upon a defining limitation on the total award, such as a first award (win) in the bonus event, two (or any predefined number) consecutive wins in the bonus event, or a consecutive number of loss events in the bonus event (e.g., 1, 2, 3 or 4 losses). The weighted alteration and its equivalents may be generically referred to as "reel mapping changes," reducing house advantage or increasing player advantage or increasing a magnitude of player wins on random or pseudo-random events.

The design of electronic reel strips allows for a number of symbols to be added into weightings such as to affect the overall outcome of the game. An increase or relative increase in the number of high-paying symbols or substitute symbols (also known as "Jokers" or "Wild" symbols) will increase the overall return of the player. Similarly, the addition or relative addition (or relative increase) of low-paying symbols at the expense of higher paying symbols will decrease the return to the player. This invention seeks to implement a method where the player is awarded a set of bonus games (also known as "feature" or "free" games) and a multitude of reel strip options may be randomly selected by the software that are then put into use. The average return from the reel strips will be the combined average return of all those reel strips.

For example, a player may spin the reels on the slot game (5×3 reel configuration) and be awarded a combination that awards 5 free games with all wins multiplied by 3. In most cases of design and in the instances listed below, these games would be played with a set of reel strips that is consistent from feature to feature or from bet configuration to bet configuration. In this invention, and for this example, the machine will pick a set of reel strips from a possible set of 3. Set 1 may have a very low average prize, while set 2 may be medium and set 3 large. The average would be determined by the weighting that each has compared to its average return.

In an EGM (electronic gaming machine), multi-reel games can be designed in such a way that the reel strips can contain many more images than mechanical reels. The number of images in a reel strip may also be varied. The invention can be implemented by modifications made to the software and mathematical models used to control an EGM. The invention can be integrated into current products or new products.

The game code can be modified such that the machine can automatically and/or randomly select which set of predetermined reel strips should be used, based on weighted probabilities, or as bonuses for previous events.

A variety of reel strip configurations are implemented so that the assigned weighting can be averaged out against the chance of appearing and the average return to the player.

As there is no discrimination by the machine as to what player received which reel strips, there is no requirement or desire to display this feature to the player. In one embodiment, the player does not know the weighting and player expectations are that the machine is varied in its behavior. As an alternative, to increase anticipation by the player, a special notice or display (visual or audible) may be displayed that a special high-potential game (with a low or negative house advantage) is being played.

The illustrations as listed below give a detailed description of non-limiting examples of entry into the invented feature and the steps through the feature. Each screen details the game meters (credit, bet, win) that track all players' individual game wagers and wins, as well as the money being held by the machine at that time. The average return=22.6×total bet.

TABLE 1

| | Average Return × total bet | Weighting |
|---|---|---|
| Reel strip set #1 | 15 | 1/10 |
| Reel strip set #2 | 18 | 2/10 |
| Reel strip set #3 | 22 | 4/10 |
| Reel strip set #4 | 26 | 2/10 |
| Reel strip set #5 | 35 | 1/10 |

Figure 5:
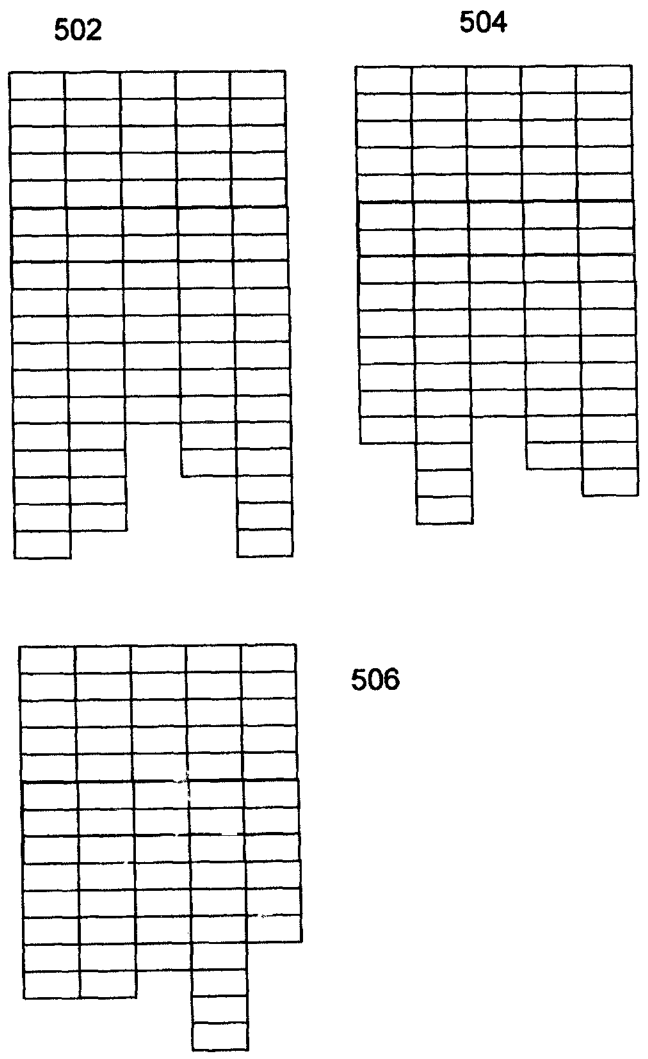
FIG. 5 shows a set of three reel options according to an embodiment of the invention.

FIG. 5 illustrates a group of optional reel sets 500. A selection (either randomly or pseudo-randomly) is made from among the reel sets 502, 504, 506 when a bonus option is awarded, and the selected reel set is used for the next play.

Figure 6:
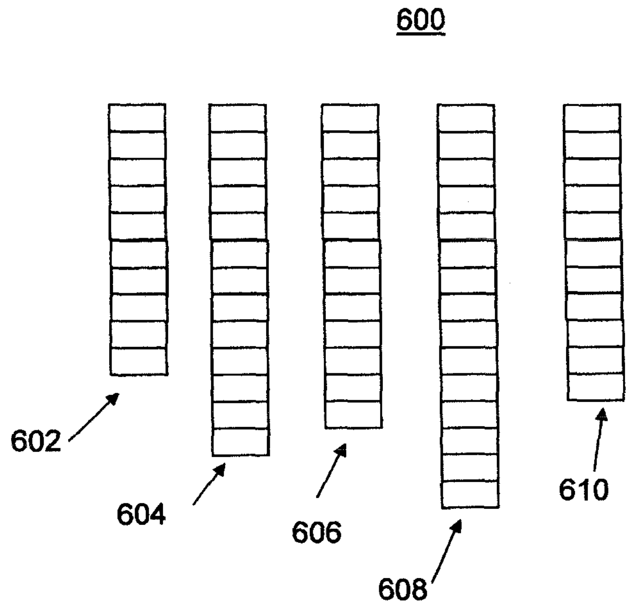
FIG. 6 shows a set of individual reels according to an embodiment of the invention.

Instead of having sets of complete reel options (that is, of the X number of total virtual reels available from the system, all X reels are available for each reel position), each reel may be individually selected from a set of individual reels (that is, a limited number of the total number of X reels may be available at each reel position). For example, if X reels are available, in the first format, reel 1 may be any of the X reels, as may reel 2 and reel 3. In the second format (where X=9), only reels 1, 2 and 3 may be available for reel position 1, only reels 4, 5 and 6 may be available for reel position 2, and reels 2, 5, 7, 8 and 9 may be available for reel position 3. Furthermore, there can be optional sets of reels set aside for each reel. This embodiment is illustrated schematically in FIG. 6, which shows a set of individual reels 600. The individual reels 602, 604, 606, 608, 610 can each have different numbers of symbols and/or different probabilities. The individual reels can be selected randomly to substitute for the reels used for the option. Alternatively, where it is desired to maintain the probability of the outcome of a game within specific parameters, the first reel can be selected randomly, and the options for each subsequent reel can be adjusted so that the overall probability remains within the required range.

Figure 3:
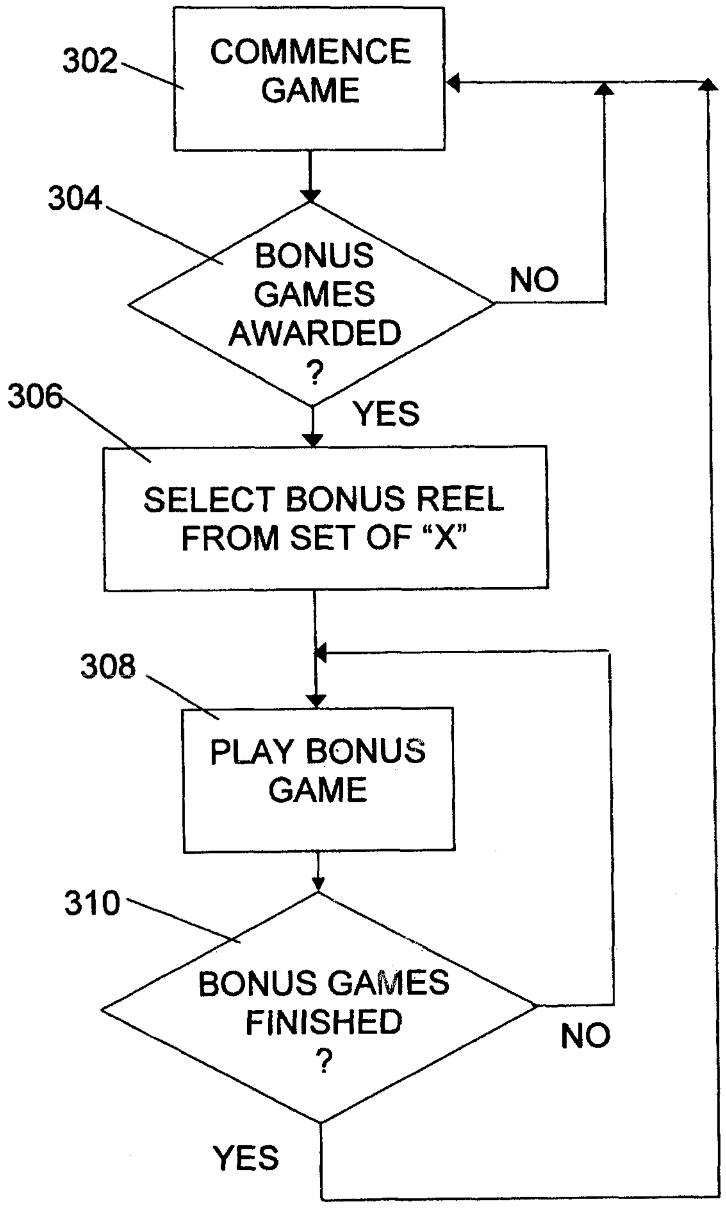
FIG. 3 is a flow diagram of the operation of a slot machine according to an embodiment of the invention.

An embodiment of the process of implementing the inventive feature is illustrated in the flow diagram of FIG. 3. At 302, the game is initiated, for example, by the player pressing a button. When the result is determined, the normal prize check (not shown) is carried out. In addition, the control system for the machine checks at 304 to see if the inventive feature, e.g., a bonus feature, has been awarded. If no bonus is awarded, play returns to the normal mode at 302, and the player can initiate a new game. If a bonus has been awarded, a new reel configuration is selected at 306 from the set of optional reel configurations and the bonus game is played at 308, either automatically or in response to an input from the player, such as by pressing a button.

After each bonus game, a check is made at 310 to determine whether all bonus games awarded have been played. If all bonus games have been played, the control returns to standard play using the standard reels. If there are bonus games remaining, the play continues with the optional reels at 308.

Figure 4:
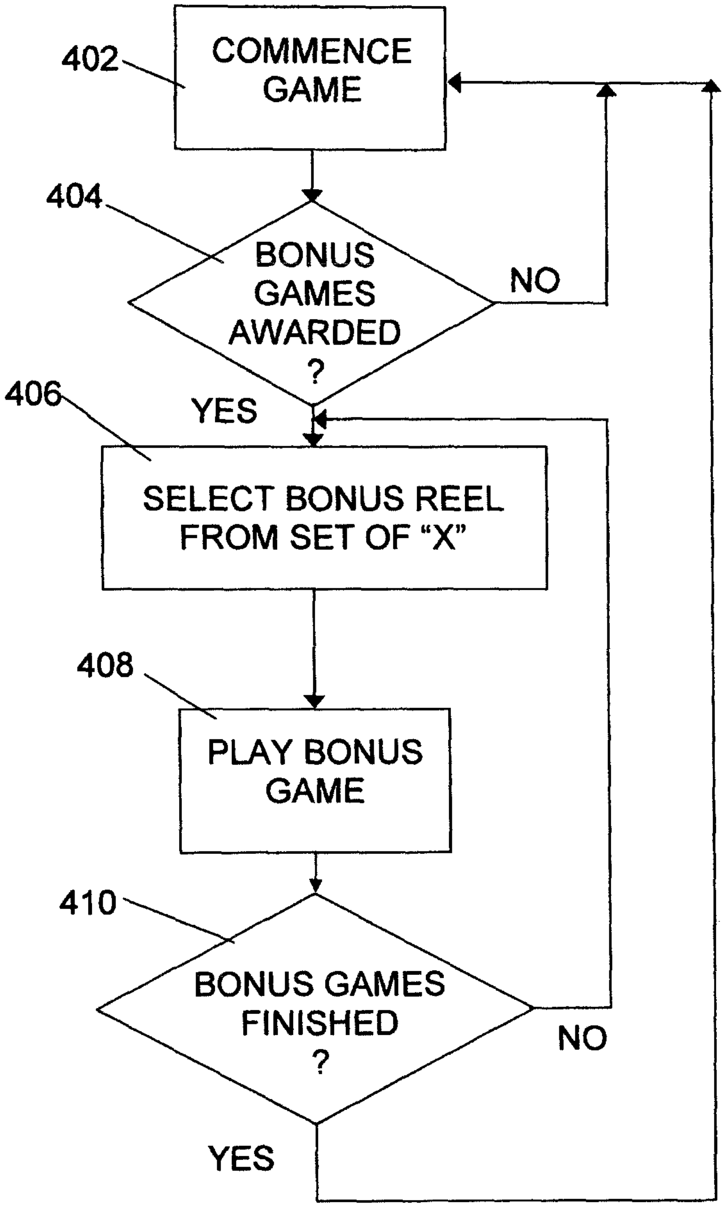
FIG. 4 is a flow diagram of an alternative method of implementing the invention.

In an alternative embodiment shown in FIG. 4, the sequence of steps 402, 404, 406, 408, 410 is similar to that of FIG. 3, with the exception that, after each game is played, the control returns to the selection of a new set of reels at 406 after each bonus game.

The present invention can be implemented using a variety of different apparatus. Preferably, the invention is implemented using a computer to determine game operations. A typical computer includes a central processing unit connected to a memory. The computer has connected thereto other devices such as display screen, buttons and/or a touch screen input device, one or more front panel buttons used in the operation of the machine; a coin, credit, token, or card acceptor for allowing a player to place bets; a network card for connecting the computer to an optional central computer, and security system connections. The central computer may be used for accounting, bookkeeping, and/or security purposes, or for downloading new game software or game software upgrades to computer, and/or for controlling the operation of the game via a network. In one optional embodiment, the computer includes a memory having a more permanent first portion in which is stored the software for running games on a CPU. This more permanent memory may be a hard disk read-only memory (ROM), erasable programmable read-only memory (EPROM), an application-specific integrated circuit (ASIC), field-programmable gate array (FPGA) or even a feed through a network to a localized or central memory. A thin client network from the central computer or local game computer to the individual gaming device may alternatively be provided. All of these integrated circuit storage means are well known in the art and so are not discussed further. The advantage to providing all game logic via a stored program on hard disk, or via network card from a central computer is that a game may quickly and easily be updated, or a different game program may be loaded to run on the computer without having to change any integrated circuit chips, such as the ROMs, EPROMs or ASICs. When game software remains on the central computer, it permits games to be played over a local network, or over a remote network, which may include the Internet. The network may be hardwired or wireless. The memory also has a second portion used in playing the games. The second portion of the memory would be typically a random access memory (RAM) with memory locations associated with each of the primary game positions, secondary game positions, secondary game progressives, information display areas and soft buttons on a display. These memory locations store information about the game symbols displayed, the bets placed, winnings, the speed of the game, etc. Alternatively, individual game software may not be permanently stored in memory. When a player touches a game selection button, or reel set selection button or control, and a game or reel set is selected for a game, the request may be transmitted via network or network card to a central computer and the game software downloaded to the more permanent memory to be used by the CPU to run the game or reel set chosen by the player. This permits central control of the games to be played on specific machines, fast upgrades of game software and easier addition of software for new games. Hardware systems and components such as those disclosed in U.S. Pat. No. 5,908,354 to Okuniewicz and U.S. Pat. No. 5,772,509 to Weiss may also be used to support the technology originally described herein.

Wherever it is used, the word “comprising” is to be understood in its “open” sense, that is, in the sense of “including,” and thus not limited to its “closed” sense, that is, the sense of “consisting only of.” A corresponding meaning is to be attributed to the corresponding words “comprise,” “comprised” and “comprises” where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are, therefore, to be considered in all respects as illustrative and not restrictive, and all modifications that would be obvious to those skilled in the art are, therefore, intended to be embraced therein.

What is claimed is:

1. A method of operating a reel-type slot machine game on an electronic gaming machine comprising a processor having associated memory and operably coupled to a video screen for display of a number of reel positions, each reel position representing a reel employed to vary an outcome probability for each play of the slot machine game to an outcome, the method including:

providing in memory at least one set of two or more different individual reel strip options for each of two or more reel positions of the number of reel positions, with each individual reel strip option differing in at least one of a number of symbol positions on the reel strip, frequency of occurrence of at least one symbol image, and a selection of symbol images from any other individual reel strip option of the at least one set, each individual reel strip option providing a different probability of prize outcomes for the slot machine game; and the processor randomly or pseudo-randomly selecting one of the two or more different individual reel strip options from the at least one set for use in an associated reel position in the slot machine game and for display on the video screen during play of the slot machine game, wherein the selection of the one individual reel strip option for at least one reel position influences availability of individual reel strip options for at least one other reel position.

2. The method of claim 1, wherein the random or pseudo-random selection of one of the two or more different individual reel strip options of the at least one set is performed for each reel position.

3. The method of claim 1, wherein each individual reel strip option of the at least one set employs the same symbol images, but at least some symbol images have different probabilities of appearance for each reel strip option of that set.

4. The method of claim 1, wherein weighting of one or more individual reel strip options in the at least one set is changed by randomly adding one or more symbols to a reel strip.

5. The method of claim 1, wherein weighting of one or more individual reel strip options in the at least one set is changed by randomly removing one or more symbols from a reel strip.

6. The method of claim 1, wherein weighting of one or more individual reel strip options in the at least one set is changed by changing one or more symbol images on each of the one ore more individual reel strips.

7. The method of claim 6, wherein a total number of symbols on at least one of the one or more individual reel strip options is unchanged after changing one or more symbol images thereon.

8. The method of claim 1, wherein providing at least one set of two or more different individual reel strip options comprises providing a set comprising at least three different individual reel strip options.

9. The method of claim 1, wherein providing at least one set of two or more different individual reel strip options for each of two or more reel positions comprises providing at least one set of two or more different individual reel strip options for each reel position, and further comprising selecting an individual reel strip option for each reel position from an associated set on a reel position by reel position basis.

10. The method of claim 1, wherein a combined average return of the different individual reel strip options in a given set is an average of the returns of the different individual reel strip options in that given set and an average return for each different individual reel strip option in that given set is different from the average return from other different individual reel strip options in that given set.

11. An electronic gaming machine, comprising:

a display screen configured to display columns representing virtual reels of a reel-type slot machine game stored in memory and operated under control of a processor, wherein each of the virtual reels is employed in each play of the reel-type slot machine game to an outcome to vary a game outcome probability;

memory storing a set of two or more different individual virtual reel strip options for use in the reel-type slot machine game in each of two or more columns, the different individual virtual reel strip options differing in at least one of a number of symbol positions on the reel strip, frequency of occurrence of at least one symbol image, and a selection of symbol images from any other individual virtual reel strip option of the set, each different individual virtual reel strip option providing a different probability of prize outcomes for the reel-type slot machine game; and the processor programmed to select an individual virtual reel strip from a set for use in each of the two or more columns for play of at least a portion of the game to an outcome, such selection of an individual virtual reel strip from a set for use in at least one column being at least random or pseudo-random;

wherein the selection of the individual reel strip option for at least one column influences availability of individual reel strip options for at least one other column.

12. The electronic gaming machine of claim 11, wherein the different individual virtual reel strip options for a set employ the same symbol images but at least some symbol images have different probabilities of appearance for each individual virtual reel strip option of that set.

13. The electronic gaming machine of claim 11, wherein a combined average return of the different individual virtual reel strip options in a given set is an average of the returns of the different individual virtual reel strip options in that given set and an average return for each individual virtual reel strip option in that given set is different from the average return from other individual virtual reel strip options in that given set.

14. The electronic gaming machine of claim 11, wherein weighting of one or more different individual virtual reel strip options in a set is changed by randomly adding one or more symbols to a reel strip.

15. The electronic gaming machine of claim 11, wherein weighting of one or more different individual virtual reel strip options in a set is changed by randomly removing one or more symbols from a reel strip.

16. The electronic gaming machine of claim 11, wherein weighting of one or more different individual virtual reel strip options in a set is changed by changing one or more symbol images on each of the one or more different individual virtual reel strip options.

17. The electronic gaming machine of claim 16, wherein a total number of symbols on at least one of the one or more different individual virtual reel strip options is unchanged after the changing of one or more symbol images thereon.

18. The electronic gaming machine of claim 11, wherein the set of two or more different individual reel strip options for each of two or more reel positions comprises providing at least one set of two or more different individual reel strip options for each reel position, and further comprising selecting an individual reel strip option for each reel position from an associated set on a reel position by reel position basis.

19. The electronic gaming machine of claim 11, wherein the random or pseudo-random selection of one of the two or more different individual virtual reel strip options of a set is performed for each column.

20. The electronic gaming machine of claim 11, wherein the set of two or more different individual reel strip options comprises at least three different individual reel strip options.

* * * * *

UNITED STATES PATENT AND TRADEMARK OFFICE

CERTIFICATE OF CORRECTION

PATENT NO. : 9,230,401 B2
APPLICATION NO. : 13/589232
DATED : January 5, 2016
INVENTOR(S) : Terry O'Halloran It is certified that error appears in the above-identified patent and that said Letters Patent is hereby corrected as shown below:

In the claims:

CLAIM 6, COLUMN 9, LINE 14, change "one ore more" to --one or more--

Signed and Sealed this
Twelfth Day of April, 2016

Michelle K. Lee

Michelle K. Lee
*Director of the United States Patent and Trademark Office*